2,945,900
Patented July 19, 1960

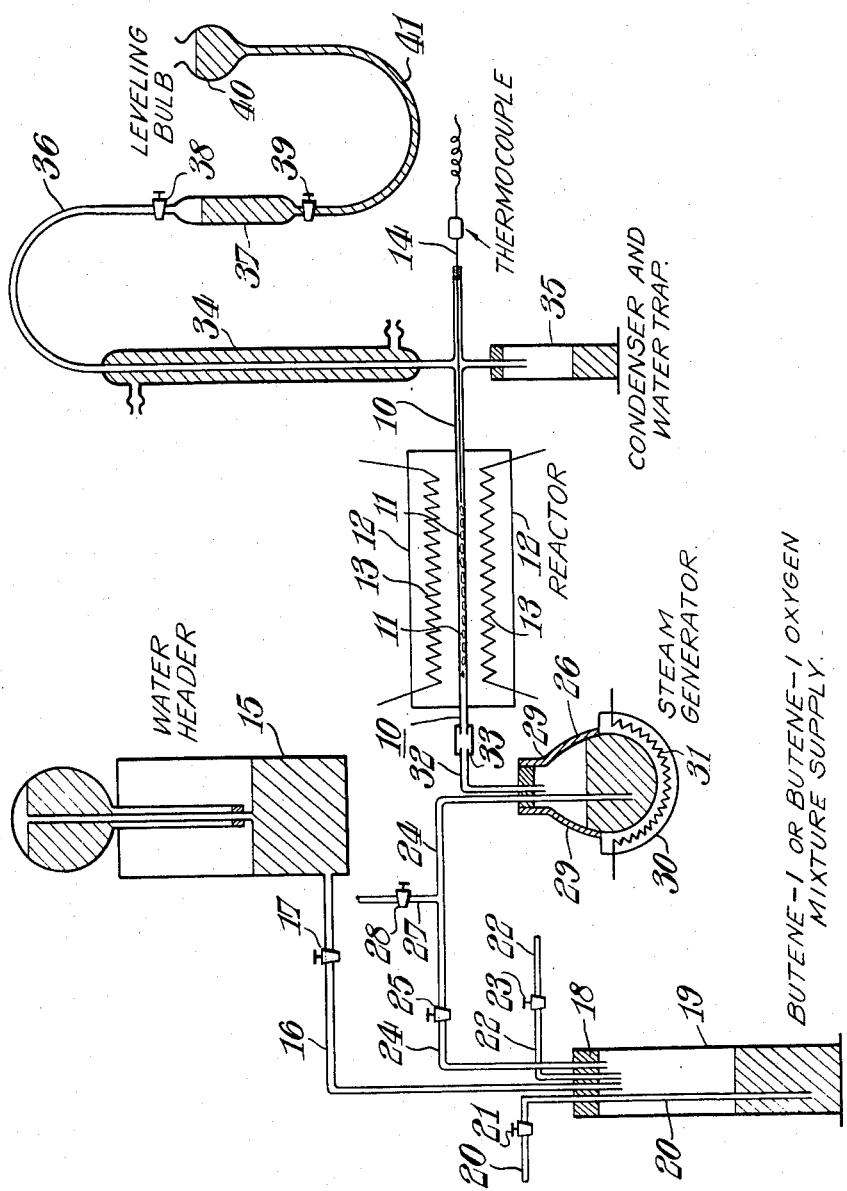

2,945,900
CATALYTIC DEHYDROGENATION OF HYDROCARBONS

Douglas Sadler Alexander and John Firko, Sarnia, Ontario, Canada, assignors to Polymer Corporation Limited, Sarnia, Ontario, Canada, a body corporate and politic Filed Sept. 3, 1957, Ser. No. 681,799

Claims priority, application Canada Aug. 1, 1957

20 Claims. (Cl. 260—669)

This invention relates to an improved process for the catalytic dehydrogenation of hydrocarbons. It relates particularly to improvements in the dehydrogenation of hydrocarbons in the presence of calcium nickel phosphate-type catalysts, and more particularly to improvements in the method of producing olefinic hydrocarbons such as butadiene-1,3 and styrene by the dehydrogenation of more saturated compounds.

The catalytic dehydrogenation of hydrocarbons in the presence of calcium nickel phosphate-type catalysts is disclosed generally in United States Patent No. 2,442,320 issued May 25, 1948 to Edgar C. Britton et al. Such dehydrogenation reactions are never completely selective; that is, it is impossible to produce a pure product because of side reactions which result in a variety of by-products. (Conversion is hereby defined as the percentage of the hydrocarbons passing over the catalyst which is converted. Percent selectivity is defined as the number of moles of desired product divided by the number of moles of hydrocarbon converted multiplied by 100. Yield is defined as the product of percent conversion and percent selectivity.) Because of this tendency to produce by-products, such dehydrogenation reactions are stopped short of completion, the actual conversion depending upon the economic considerations of the particular process. In fact, the conversion of hydrocarbon in a single contact dehydrogenation operation is frequently less than 50 percent. Furthermore the product stream often contains only about 15–30 percent by weight of the desired hydrocarbon compound, the proportion depending upon the selectivity of the reaction. Hence, in order to obtain substantially pure product and also not to waste the unconverted hydrocarbon, it is necessary to separate the desired compound from the reaction product stream and to recycle the remainder of the stream and recontact it with the dehydrogenation catalyst.

Extraction of the desired compound from the reactor product stream is normally carried out at a low temperature and the unconverted hydrocarbons therefor require reheating before being recycled. For example, it is common practice to extract butadiene-1,3 from a dehydrogenated n-butylene stream by contacting the stream with an ammoniacal cuprous acetate solvent at temperatures ranging from about −16° C. to about 0° C. It is readily appreciated that it is desirable to effect as high a conversion as possible for each contacting operation with the dehydrogenation catalyst, and as complete a separation as possible of the desired components from the reactor effluent in the extraction step, in order to reduce the power and heat energy requirements as well as equipment costs in reprocessing larger quantities of recycle hydrocarbons.

In certain catalyzed dehydrogenation processes, side reactions result in a carbonaceous deposit on the catalyst causing a gradual reduction in its activity. Therefore, to maintain the activity of the catalyst it is necessary to remove the carbonaceous deposit periodically. It is general practice in such catalytic dehydrogenation operations, to use a cyclic process comprising alternately effecting dehydrogenation of the hydrocarbon and removal of the carbonaceous deposit from the catalyst. The part of the cycle during which the hydrocarbon is dehydrogenated is called the "process period" while the part in which the carbonaceous deposit is oxidized is called the "regeneration period." In the case of a calcium nickel phosphate-type catalyst, the process period is normally effected at temperatures between about 550° C. and about 650° C. by passing a mixture of the hydrocarbon and steam through the catalyst bed, while the regeneration period is carried out at about the same temperature by passing a mixture of air and steam through the catalyst bed. In the past, it has been found necessary to regenerate calcium nickel phosphate-type dehydrogenation catalysts after process periods of from about 30 to about 90 minutes. The cyclic operation of dehydrogenating the hydrocarbon and regenerating the catalyst is believed to be harmful to the life of dehydrogenation catalysts. Normally, catalyst life is about six months and because of the large amounts of catalyst used, it is desirable to extend the life of such catalyst as much as possible. In other words, it is desirable to reduce the rate of carbon deposition on the catalyst during the process period since this decreases the number of cyclic operations required in any given period of time and not only tends to extend the catalyst life but also permits increased production per unit time.

Accordingly, it is an object of the present invention to disclose an improved process for the catalytic dehydrogenation of hydrocarbons wherein the percentage conversion is increased significantly.

It is a further object to increase the life of a calcium nickel phosphate dehydrogenation catalyst by decreasing the rate of deposition of carbon thereon.

It is a further object of the invention to increase the catalyst life by operating at lower feed temperatures.

These and other objects of the present invention are achieved in the process of dehydrogenating a hydrocarbon selected from the class consisting of mono-olefins and alkylated aromatics which comprises passing said hydrocarbon together with steam at a dehydrogenation temperature over a dehydrogenation catalyst, the active ingredient of which is calcium nickel phosphate by the improvement which comprises carrying out said dehydrogenation in the presence of from about 5 to about 40 parts of uncombined oxygen, based on the volume of said hydrocarbon.

The present invention is based on the discovery that the presence of a substantial amount of oxygen in the reactor during dehydrogenation in the presence of calcium nickel phosphate-type catalyst results in a substantial increase in yield. There is also a surprising decrease in the rate of deposition of carbonaceous material on the catalyst so that the activity of the catalyst decreases more slowly during the process period than is the case in the absence of oxygen.

In the practice of the invention, the catalyst bed is heated to the desired reaction temperature before the admission of hydrocarbon, preferably by passing therethrough steam superheated to a suitably high temperature. However, it may also be brought to the desired temperature by the application of external heat to the reactor. The hydrocarbon and steam are usually heated in separate furnaces and then admixed before contact with the catalyst, the hydrocarbon to about 450° C. to about 550° C. and the steam to about 700° C. to about 850° C. or higher so that a mixture of the two has the desired reaction temperature of about 550° C. to about 650° C. The heat may also be supplied by forming the steam and hydrocarbon mixture at a lower temperature and passing the mixture through a preheater to bring it to the reaction temperature or by externally heating the reactor containing the catalyst.

Oxygen may be introduced into the system in any satisfactory form so long as it is present in the reactor in uncombined form. Uncombined oxygen is hereby defined as oxygen which is not combined with any other element but exists as O, $O_2$ or $O_3$. It may be introduced as substantially pure oxygen or in atmospheric air, or it may be introduced in a compound such as hydrogen peroxide, which liberates oxygen under the conditions prevailing in the dehydrogenation reactor. Other compounds which can be used satisfactorily include nitrogen dioxide, sulphur trioxide and organic peroxides and hydroperoxides such as benzoyl peroxide, cumene hydroperoxide and diisopropyl benzene hydroperoxide. Obviously, the oxygen cannot be introduced in combined form in a compound which, on decomposition, will form a by-product that is injurious to the dehydrogenation process. For example, perchloric acid cannot be used since its decomposition results in the production of chlorine and chlorine is known to be a poison for calcium nickel phosphate dehydrogenation catalysts. Those skilled in the art are readily able to select compounds which may be used satisfactorily as oxygen sources.

The oxygen source may be introduced into the reactor in various ways. It may be admixed with relatively cool hydrocarbon or with the steam, or it may be added directly to the reactor. However, it is important to add the oxygen in such a way that is in dilute form before coming in contact with hydrocarbon at a high temperature. This procedure reduces the danger of a localized high concentration of oxygen resulting in a partial burning of the hydrocarbon. For example, if hydrocarbon and steam are admixed before passage through a preheater to bring them to reaction temperature, the oxygen source may be mixed satisfactorily with either the hydrocarbon or the steam. If the hydrocarbon is heated to a high temperature, before admixture with the steam, it is necessary to admix the oxygen with the steam so that the oxygen is highly diluted before contacting the hydrocarbon.

The concentration of oxygen which it is desirable to have in the reactor lies generally between about 5 and about 40 volume percent and preferably from about 10 to about 30 volume percent based on the hydrocarbon feed. Such concentration depends upon various conditions. In general, the hydrocarbon conversion increases as the concentration of oxygen increases, with no appreciable drop in selectivity, up to a maximum, after which the selectivity gradually decreases with a further increase in oxygen concentration. The optimum concentration under any given set of conditions can be readily determined by those skilled in the art. It depends on the dehydrogenation temperature and the particular catalyst being used. Furthermore, such catalysts generally decrease in activity with continued use so that operating conditions must be varied slightly as the catalyst ages, for example by use of a higher reaction temperature.

The quantity of steam used may vary widely and is generally between about 10 and about 50 volumes per volume of the hydrocarbon vapor being dehydrogenated. The dehydrogenation reaction is usually carried out at about atmospheric pressure, for convenience, but higher or lower pressures may be used if desired. For best results, the hydrocarbon-steam-oxygen mixture should be contacted with the catalyst for only a short period of time, although a short contact time is not essential for success. It is usually desirable to utilize a contact time between about 0.25 and 1 second, although times outside this range can be used without departing from the scope of the invention. The optimum contact time varies with the particular hydrocarbon being dehydrogenated, the reaction temperature and the hydrocarbon/steam ratio.

To prevent the catalyst from becoming inactive due to the accumulation of the carbonaceous deposit it is regenerated periodically. In effecting the regeneration, the flow of hydrocarbon and oxygen is first stopped and oxygen is introduced together with the steam at a controlled rate in order to remove the carbonaceous deposit without causing a sudden rise in the temperature of the catalyst bed. When the regeneration is completed, the flow of regenerating oxygen is stopped, the reactor flushed with steam and the flow of hydrocarbon and oxygen resumed. Obviously, the regenerating oxygen may be supplied by air or by the same oxygen source as that used during the process period.

The hydrocarbons which may be dehydrogenated according to the present invention are any of those which may be catalytically dehydrogenated in the presence of a calcium nickel phosphate-type catalyst. Examples of suitable hydrocarbons are those which are disclosed and claimed in U.S. Patent No. 2,442,320 issued May 25, 1948 to Edgar C. Britton et al. Such hydrocarbons include olefins having in the molecule at least four carbon atoms in the carbon chain containing the olefinic linkage; examples include butylene, pentene and hexene. The invention is particularly useful in dehydrogenating olefins having from four to six carbon atoms in the molecule and only four carbon atoms in the unsaturated chain to form the corresponding conjugated diolefins, e.g. n-butylene may be dehydrogenated to produce butadiene-1,3 and isopentene may be dehydrogenated to produce isoprene. The invention is also useful in dehydrogenating hydrocarbons which have a center of unsaturation other than an olefinic linkage (for example, for dehydrogenating hydrocarbons containing a benzene ring). For instance, alkyl aromatic hydrocarbons having at least two carbon atoms in the alkyl group can be advantageously dehydrogenated to the corresponding olefin by the process of the present invention. Thus, styrene can be produced by the dehydrogenation of ethylbenzene.

The reason for increased conversion of olefins and aromatic compounds when dehydrogenation over calcium nickel phosphate catalysts was carried out in the presence of oxygen is not completely understood but so far as the inventors have been able to determine, the effect is produced only with dehydrogenation catalysts in which the active ingredient is calcium nickel phosphate. An attempt was made to increase the conversion of butylenes to butadiene-1,3 and of ethylbenzene to styrene by conducting the dehydrogenation in the presence of added oxygen using a conventional iron oxide dehydrogenation catalyst such as that disclosed in United States Patent No. 2,426,829 issued to K. K. Kearby on September 2, 1947. It was found that the activity of the catalyst was significantly reduced in comparison with operations in the absence of oxygen. Similar unsatisfactory results were obtained in dehydrogenating butylene over a zinc oxide catalyst and butane over a conventional chrome-alumina catalyst.

One method of practising the present invention on a laboratory scale is illustrated diagrammatically in the accompanying figure. Reference numeral 10 designates a glass reactor tube carrying catalyst pellets 11 and located in the electric furnace 12 which is heated by electrical heating elements 13. The temperature inside the tube is measured by thermocouple 14. Container 15 is a water reservoir with a constant bend connected by line 16 carrying stop-cock 17 and passing through stopper 18 into a graduated cylinder 19. Also passing through stopper 18 are: tube 20 carrying stop-cock 21 and connected to a drain not shown; tube 22 carrying stop-cock 23 and being connected to a hydrocarbon source not shown; and tube 24 carrying stop-cock 25 and passing into steam generator 26. Joining tube 24 is tube 27 carrying stop-cock 28 and connected to an air source not shown. Steam generator 26 is partially surrounded by insulation 29 to minimize heat losses and partially surrounded by heating jacket 30 which carries electrical heating element 31. Tube 32 connects the steam generator 26 to the reactor tube 10 by means of coupling 33. The end of the reactor tube remote from the steam generator is connected to the lower end of a water-cooled condenser 34 and to condensate receiver 35. The upper end of the condenser 34 is connected through tube 36 to the upper end of a product receiver 37 equipped with stop-cocks 38 and 39. The lower end of receiver 37 is in turn connected to a levelling bulb 40 by means of tube 41.

In carrying out catalytic dehydrogenation reactions using the hereinabove described apparatus, the following procedure may be adopted: First, the graduated cylinder 19 is completely filled with water. Then with stop-cocks 17 and 25 closed and with stop-cocks 21 and 23 open, the hydrocarbon to be dehydrogenated and oxygen are introduced through line 22 displacing water through line 20 to the drain until the desired volume of hydrocarbon-oxygen mixture is present in cylinder 19. Next, stop-cocks 21, 23 and 28 are closed and stop-cock 25 opened. Stop-cock 17 is then opened and water allowed to flow from reservoir 15 through line 16 and into cylinder 19 at a controlled rate. The gas in cylinder 19 is thus forced through line 24 and into steam generator 26 where it bubbles through heated water and, in admixture with steam, passed through line 32 and thence to reactor tube 10. The reactor product passes to the water-cooled condenser 34. Steam condenses to water and is collected in receiver 35. The uncondensed vapours pass from the upper end of the condenser through line 36 and into product receiver 37. As the product enters receiver 37 it displaces water therefrom into a levelling bulb 40 whose height is continuously adjusted to maintain the pressure in the reactor tube as constant as possible. When receiver 37 is filled with product, stop-cocks 38 and 39 are closed. The receiver is then disconnected and its contents analyzed by conventional methods.

The temperature of the reactor tube carrying the catalyst in pellet form is controlled at the desired level by regulating the voltage of the electric supply to elements 13. The hydrocarbon enters the steam generator at room temperature and leaves in admixture with steam at a temperature of about 100° C. The ratio of steam to hydrocarbon leaving the generator is regulated by the electrical input to the heating element 31 and is readily determined by measuring the rate of accumulation of water in receiver 35 which is conveniently a graduated cylinder.

Regeneration of the catalyst is effected by closing stop-cock 25, opening stop-cock 28, and forcing controlled amounts of an oxygen-containing gas such as air through line 27 into line 24 and through steam generator 26 where it is admixed with steam. After a suitable regeneration period the catalyst is ready for a resumption of dehydrogenation operation.

The following examples will further illustrate the practice and advantages of the present invention, using, in all but Example XII, the apparatus hereinabove described. The catalyst used in all of the examples was a commercial calcium nickel phosphate-chromium oxide catalyst of the type described in United States Patent No. 2,442,320 issued May 25, 1948 and prepared in accordance with United States Patent No. 2,542,813 issued February 20, 1951 to S. B. Heath. A typical chemical analysis of such catalyst in weight percent is: nickel, 5.0; calcium, 30.3; phosphate radical, 53.2; chromic oxide, 2.9; graphite, 2.4.

EXAMPLE I 1800 mls. of research grade butene-1 were mixed with steam in the ratio of about 1:40 parts by volume by passing the butene through boiling water. The mixture was passed at the rate of 30 mls. per minute of butene-1 measured at room temperature and atmospheric pressure over 10 grams of catalyst contained in a quartz tube. The contact time of the hydrocarbon with the catalyst was about 0.25 second. The tube and contents were maintained at 650° C., over a length of 24 inches, in an electric furnace. The temperature was measured by a chromel-alumel thermocouple placed near the gas exit end of the catalyst bed and about 6 inches inside the furnace. The steam was condensed and the hydrocarbon collected in a receiver. The hydrocarbon product was analyzed for butadiene-1,3 by a gas chromatography, by mass spectrometry, and by infra-red techniques. The catalyst was regenerated in the conventional manner by passing a mixture of air and steam over it at the dehydrogenation temperature. This dehydrogenation-regeneration cycle was repeated a number of times and the results are shown in Table I.

*Table I.—Dehydrogenation of butene-1 at 650° C.*

| Sample No. | Steam/HC (Volumes) | Percent Conversion | Percent Selectivity | Percent Yield of Butadiene-1,3 |
| --- | --- | --- | --- | --- |
| 1 | 40:1 | 44.4 | 94.4 | 41.9 |
| 2 | 40:1 | 44.2 | 94.8 | 41.9 |
| 3 | 40:1 | 42.2 | 94.8 | 40.0 |
| 4 | 40:1 | 42.1 | 93.6 | 39.4 |
| 5 | 39:1 | 45.5 | 93.7 | 42.6 |
| 6 | 41:1 | 43.9 | 94.5 | 41.5 |
| 7 | 39:1 | 46.1 | 93.7 | 43.1 |
| 8 | 40:1 | 43.1 | 96.1 | 41.4 |
| 9 | 39:1 | 46.7 | 94.0 | 43.8 |
| 10 | 40:1 | 45.4 | 94.5 | 42.9 |

EXAMPLE II

The operations of Example I were repeated except that the butene-1 was replaced by 1800 mls. of a mixture of butene-1 and oxygen in which oxygen made up 20 percent by volume. The results are shown in Table II.

*Table II.—Dehydrogenation of butene-1 in the presence of 20 volume percent oxygen*

| Sample No. | Steam/HC (Volumes) | Percent Conversion | Percent Selectivity | Percent Yield of Butadiene-1,3 |
| --- | --- | --- | --- | --- |
| 1 | 40:1 | 51.8 | 92.0 | 47.6 |
| 2 | 40:1 | 50.4 | 94.2 | 47.5 |
| 3 | 40:1 | 49.9 | 95.6 | 47.7 |
| 4 | 40:1 | 50.4 | 92.2 | 46.5 |
| 5 | 40:1 | 49.9 | 92.3 | 46.1 |
| 6 | 41:1 | 47.1 | 93.2 | 43.9 |
| 7 | 42:1 | 44.6 | 92.6 | 41.3 |
| 8 | 40:1 | 51.9 | 92.6 | 48.0 |
| 9 | 40:1 | 50.2 | 91.2 | 45.8 |

On comparing these results with those of Table I it is seen that the presence of 20 percent oxygen results in a substantial increase in the conversion of butene-1 to butadiene-1,3.

EXAMPLE III

The effect of oxygen concentration on the dehydrogenation of butene-1 at 575° C. was tested by dehydrogenating butene-1 according to Example II except that the proportion of oxygen in the feed was varied. The results are shown in Table III.

*Table III.—Effect of $O_2$ concentration on dehydrogenation of butene-1 at 575° C.*

| Sample No. | Oxygen added (Vol. percent of butene-1) | Percent Conv. | Percent Select. | Percent Yield of Butadiene-1,3 | Percent Increase in Yield |
| --- | --- | --- | --- | --- | --- |
| 1* | 0 | 22.5 | 97.7 | 22.0 | --- |
| 2 | 5 | 27.9 | 95.6 | 26.5 | 20.4 |
| 3 | 10 | 31.2 | 94.4 | 29.5 | 33.8 |
| 4 | 15 | 37.6 | 87.6 | 33.0 | 50.0 |
| 5 | 20 | 30.5 | 89.3 | 27.2 | 23.6 |
| 6 | 30 | 30.0 | 86.4 | 25.9 | 17.5 |

*Sample 1 is the average of six results, Samples 2–6 inclusive are each the average of 2 results.

EXAMPLE IV

The effect of oxygen concentration on the dehydrogenation of butene-1 at 610° C. was tested by dehydrogenating butene-1 according to Example II except that the proportion of oxygen in the feed was varied. The results are shown in Table IV.

Table IV.—*Effect of $O_2$ concentration on dehydrogenation of butene-1 at 610° C.*

| Sample No. | Oxygen Conc. (Vol. percent of butene-1) | Percent Conv. | Percent Select. | Percent Yield of Butadiene | Percent Increase in Yield |
|---|---|---|---|---|---|
| 1* | 0 | 26.0 | 97.0 | 25.1 | |
| 2 | 5 | 29.4 | 97.0 | 28.6 | 13.8 |
| 3 | 10 | 31.9 | 95.8 | 30.5 | 21.6 |
| 4 | 15 | 37.9 | 92.4 | 35.0 | 39.4 |
| 5 | 20 | 42.8 | 91.5 | 39.2 | 56.2 |
| 6 | 30 | 43.5 | 89.8 | 39.0 | 55.4 |

*Sample 1 is the average of six results. Samples 2-6 are each the average of two results.

EXAMPLE V

The effect of oxygen concentration on the dehydrogenation of butene-1 at 660° C. was tested by dehydrogenating butene-1 according to Example II except that the proportion of oxygen in the feed was varied. The results are shown in Table V.

Table V.—*Effect of $O_2$ concentration on dehydrogenation of butene-1 at 660° C.*

| Sample No. | Oxygen added (Vol. percent of butene-1) | Percent Conv. | Percent Select. | Percent Yield of Butadiene | Percent Increase in Yield |
|---|---|---|---|---|---|
| 1* | 0 | 40.6 | 96.3 | 38.3 | |
| 2 | 5 | 42.9 | 93.9 | 40.3 | 6.0 |
| 3 | 10 | 44.2 | 92.5 | 41.0 | 7.1 |
| 4 | 15 | 47.9 | 91.5 | 43.8 | 14.4 |
| 5 | 20 | 49.0 | 91.5 | 44.8 | 17.0 |
| 6 | 30 | 49.3 | 87.5 | 43.1 | 12.5 |
| 7 | 40 | 46.1 | 85.4 | 39.5 | 3.1 |

*Sample 1 is the average of six results. Samples 2-6 are each the average of two results.

The data of Tables III, IV and V show that the yield of butadiene-1,3 from butene-1 varies with the oxygen concentration, reaching a maximum at between about 10 and about 30 volume percent oxygen and then decreasing at higher amounts of oxygen. The data also show that the optimum concentration of oxygen varies with the dehydrogenation temperature.

EXAMPLE VI

The effect of air on the dehydrogenating of butene-1 at 650° C. was tested by dehydrogenating butene-1 alone as in Example I and mixed with oxygen as in Example II except that the oxygen was supplied by 25, 50 and 70 volume percent of air. The results are shown in Table VI and are similar to those obtained in Example II using corresponding amounts of oxygen.

Table VI.—*Effect of air on the catalytic dehydrogenation of butene-1 at 650° C.*

| Sample No. | Air added (Vol. percent of butene-1) | Percent Conv. | Percent Select. | Percent Yield of Butadiene | Percent Increase in Yield |
|---|---|---|---|---|---|
| 1 | 0 | 40.2 | 91.9 | 36.9 | |
| 2 | 25 | 40.9 | 92.0 | 37.6 | 2.0 |
| 3 | 50 | 46.1 | 91.7 | 42.2 | 14.1 |
| 4 | 70 | 47.2 | 91.5 | 45.6 | 23.5 |

EXAMPLE VII 1800 mls. of butene-1 were mixed with steam in the ratio of about 1:40 parts by volume as in Example I and hydrogen peroxide was added to the mixture from a burette at such a rate as to produce, on decomposition, 20% by volume of oxygen on the butene-1. The mixture was then dehydrogenated as in Example I. The results are shown in Table VII.

Table VII.—*Dehydrogenation of butene-1 at 650° C. in the presence of $H_2O_2$*

| Sample No. | Steam/HC (Volume) | Percent Conversion | Percent Selectivity | Percent Yield of Butadiene |
|---|---|---|---|---|
| 1 | 40:1 | 55.3 | 84.0 | 46.5 |
| 2 | 40:1 | 55.3 | 90.5 | 50.0 |
| 3 | 41:1 | 45.9 | 93.4 | 42.9 |
| 4 | 42:1 | 45.6 | 94.4 | 43.3 |
| 5 | 40:1 | 52.0 | 91.7 | 47.7 |
| 6 | 40:1 | 51.1 | 92.7 | 47.4 |

EXAMPLE VIII

A test was carried out to show the rate of decrease of activity of a calcium nickel phosphate-chromium oxide catalyst with the length of the process period. Butene-1 was dehydrogenated as in Example I except that the process period was continued for 14⅓ hours without regenerating the catalyst. Then the test was repeated using a butene-1 oxygen mixture as in Example II except that the process period was continued for 10⅚ hours without regenerating the catalyst. Samples of the product taken at intervals were analyzed and the results are shown in Table VIII.

Table VIII.—*Effect of process period length on catalyst activity*

| Pure Butene-1 | | | | Butene-1 Containing 20% $O_2$ | | | |
|---|---|---|---|---|---|---|---|
| Time of Run (hrs.) | Percent Conv. | Percent Select. | Percent Yield | Time of Run (hrs.) | Percent Conv. | Percent Select. | Percent Yield |
| ¾ | 42.8 | 93.6 | 40.0 | ¾ | 51.9 | 92.6 | 48.0 |
| 3 | 41.3 | 92.5 | 38.2 | 2½ | 50.2 | 91.2 | 45.8 |
| | | | | 3½ | 51.6 | 92.0 | 47.5 |
| 6½ | 34.3 | 94.2 | 32.4 | 5⅚ | 41.7 | 92.6 | 38.6 |
| 8⁷⁄₁₂ | 32.6 | 94.3 | 30.7 | 8¼ | 47.5 | 91.5 | 43.5 |
| 14⅓ | 21.8 | 94.8 | 20.6 | 10⅚ | 48.9 | 88.6 | 43.4 |

These results show that when oxygen is present during the dehydrogenation, the catalyst activity decreases much more slowly than in the absence of oxygen. It is seen that in conventional operation the percent conversion decreased from 42.8 to 32.6 in 8⁷⁄₁₂ hours and to 21.8 in 14⅓ hours, while the yield dropped from 40.0 to 30.7 and 20.6, respectively. On the other hand, when the butene contained 20% oxygen the conversion only decreased from 51.9% to 48.9% and the yield only decreased from 48.0 to 43.4% in 10⅚ hours. Therefore, it is possible to operate satisfactorily for long process periods when oxygen is present, thus reducing significantly the non-productive portion of conventional dehydrogenation operations.

EXAMPLE IX

To test the rate of carbon deposition on the catalyst, butene-1 and mixtures of butene-1 with 15 and 20% oxygen were dehydrogenated as in Examples I and II. After a process period of one hour the reactor was purged of hydrocarbons with steam. Then air was passed through the reactor to oxidize deposited carbon. The effluent carbon dioxide was removed in a calcium hydroxide solution scrubber and the amount of carbon calculated from the weight of the resulting precipitate. The results are shown in Table IX and indicate that the presence of oxygen during the dehydrogenation reaction results in a surprising reduction in the amount of carbon deposited on the catalyst.

Table IX.—Carbon deposition on calcium nickel phosphate-chromium oxide catalyst during one hour of dehydrogenation reaction at 650° C.

| Oxygen Concentration in Butene-1, Feed Vol. Percent | Carbon Deposited per Gram of Butene-1 Passed Over Catalyst (Grams) |
|---|---|
| 0 | $2.10 \times 10^{-2}$ |
| 0 | $2.08 \times 10^{-2}$ |
| 20 | $0.90 \times 10^{-2}$ |
| 15 | $0.92 \times 10^{-2}$ |
| 15 | $1.06 \times 10^{-2}$ |

EXAMPLE X

Research grade trans-butene-2 was dehydrogenated alone as in Example I and in admixture with 10 and 20 volume percent oxygen as in Example II with the reactions being carried out at 600° C., 625° C., 650° C. The product in each case was analyzed for butadiene-1,3 and the results are shown in Table X.

Table X.—Catalytic dehydrogenation of butene-2 in admixture with $O_2$

| Sample No. | Temp. (° C.) | Oxygen added (Vol. percent of butene-2) | Percent Conv. | Percent Select. | Percent Yield of Butadiene-1 |
|---|---|---|---|---|---|
| 1 | 600 | 0 | 32.2 | 97.0 | 31.2 |
| 2 | 600 | 10 | 39.3 | 95.0 | 37.3 |
| 3 | 600 | 20 | 40.8 | 92.6 | 37.8 |
| 4 | 625 | 0 | 38.7 | 96.8 | 37.5 |
| 5 | 625 | 10 | 43.2 | 95.3 | 41.2 |
| 6 | 625 | 20 | 48.1 | 91.9 | 44.7 |
| 7 | 650 | 0 | 43.8 | 95.3 | 41.7 |
| 8 | 650 | 10 | 53.6 | 93.6 | 50.1 |
| 9 | 650 | 20 | 53.5 | 93.0 | 49.8 |

The results are similar to those obtained for butene-1.

EXAMPLE XI

Ethylbenzene was dehydrogenated using the laboratory apparatus described above except that the reactor tube contained 93 grams of catalyst. Oxygen was mixed with the steam and the ethylbenzene was added to the hot reactor tube from a burette. The rate of addition of ethylbenzene was determined from the burette readings. The product was analyzed for styrene using liquid-gas chromatography and the results are shown in Table XI.

Table XI.—Dehydrogenation of ethylbenzene in the presence of oxygen

| Sample No. | Reaction Temp. (° C.) | Rate of Ethylbenzene addition (gm./min.) | Vol. of Ethylbenzene/Vol. of Catalyst/hr.[1] | Rate of Steam (ml. $H_2O$/min.) | Rate of $O_2$ (ml./min.) | Percent Conv. | Percent Select. | Percent Yield of Styrene |
|---|---|---|---|---|---|---|---|---|
| 1 | 600 | 0.63 | 69.2 | 1.0 | none | 47.9 | 90.1 | 43.2 |
| 2 | 600 | 0.60 | 66.0 | 1.0 | 21 | 56.0 | 83.1 | 46.5 |
| 3 | 600 | 0.60 | 66.0 | 1.0 | 22 | 51.8 | 83.6 | 43.3 |
| 4 | 575 | 0.62 | 68.1 | 1.0 | none | 45.9 | 90.2 | 41.4 |
| 5 | 550 | 0.60 | 66.0 | 0.96 | none | 36.5 | 88.0 | 32.1 |
| 6 | 550 | 0.58 | 63.6 | 1.0 | 22 | 45.6 | 86.3 | 39.3 |

[1] Volume of ethylbenzene/volume of catalyst/hour is the volume of ethylbenzene at N.T.P./volume of catalyst/hour.

EXAMPLE XII

Butene-1 was dehydrogenated at 560° C. on a pilot plant scale over the same catalyst as used in the laboratory scale apparatus. Alternating process and regeneration periods of one hour were used. The ratio of steam to hydrocarbon was 20/1 on a volume basis and the contact time was 0.5 seconds. At the beginning of the run no oxygen was introduced with the hydrocarbon in order to establish a value for the conversion achieved in the absence of oxygen. When this value had been established oxygen was introduced in admixture with the steam. Samples of the product were taken periodically and analyzed for butadiene-1,3. The experiment of run 1 was repeated in runs 2 and 3 except that the temperature was 600° C. and that further blank dehydrogenations were effected by stopping the addition of oxygen after a substantial number of cycles and dehydrogenating the hydrocarbon in the conventional manner. The results are shown in Table XII.

Table XII.—Pilot plant dehydrogenation of butene-1 in the presence of oxygen

RUN #1.—REACTION TEMPERATURE 560° C.

| Sample No. | Cycle No. | Oxygen added (Vol. percent of butene-1) | Percent Conv. | Percent Select. | Percent Yield |
|---|---|---|---|---|---|
| 1 | 20 | none | 30.3 | 94.8 | 28.7 |
| 2 | 26 | 5 | 31.6 | 94.0 | 29.7 |
| 3 | 32 | 10 | 36.8 | 91.0 | 33.5 |
| 4 | 36 | 15 | 38.0 | 86.1 | 32.7 |
| 5 | 38 | 15 | 38.0 | 86.7 | 32.9 |

RUN #2.—REACTION TEMPERATURE 600° C.

| 1 | 20 | none | 43.0 | 94.7 | 40.7 |
|---|---|---|---|---|---|
| 2 | 26 | 5 | 48.2 | 91.8 | 44.2 |
| 3 | 29 | 10 | 52.9 | 85.2 | 45.1 |
| 4 | 32 | 10 | 50.2 | 91.6 | 46.0 |
| 5 | 39 | 15 | 53.5 | 84.3 | 45.1 |
| 6 | 46 | 20 | 50.8 | 85.0 | 43.2 |
| 7 | 47 | 20 | 53.7 | 86.2 | 46.3 |
| 8 | 55 | none | 42.4 | 89.1 | 37.8 |

RUN #3.—REACTION TEMPERATURE 600° C.

| 1 | 15 | none | 46.4 | 94.5 | 43.8 |
|---|---|---|---|---|---|
| 2 | 21 | 5 | 46.5 | 94.2 | 43.8 |
| 3 | 26 | 10 | 50.8 | 88.7 | 45.1 |
| 4 | 33 | 15 | 49.3 | 91.3 | 45.1 |
| 5 | 38 | 20 | 53.3 | 85.4 | 45.5 |
| 6 | 39 | 20 | 50.6 | 89.0 | 45.0 |
| 7 | 53 | none | 45.7 | 93.5 | 42.7 |

These results show that operating on a pilot plant scale with a ratio of steam/hydrocarbon of 20/1, there is a significant increase in the production of butadiene-1,3 from butene-1 when appreciable quantities of oxygen are present in the reactor.

What we claim is:

1. In the process of dehydrogenating a hydrocarbon selected from the class consisting of mono-olefins and alkylated aromatics which comprises passing said hydrocarbon together with steam at a dehydrogenation temperature over a dehydrogenation catalyst, the active ingredient of which is calcium nickel phosphate, the improvement which comprises carrying out said dehydrogenation in the presence of between about 5 and about 40 percent uncombined oxygen, based on the volume of said hydrocarbon.

2. In the process of dehydrogenating a mono-olefinic hydrocarbon containing at least four carbon atoms in the olefinic chain which comprises passing said hydrocarbon together with steam at a dehydrogenation temperature over a dehydrogenation catalyst, the active ingredient of which is calcium nickel phosphate, the improvement which comprises carrying out said dehydrogenation in the presence of between about 5 and about 40 percent uncombined oxygen, based on the volume of said hydrocarbon.

3. In the process of dehydrogenating a mono-olefinic hydrocarbon containing from four to six carbon atoms in the olefinic chain which comprises passing said hydrocarbon together with steam at a dehydrogenation temperature over a dehydrogenation catalyst, the active ingredient of which is calcium nickel phosphate, the improvement which comprises carrying out said dehydrogenation in the presence of between about 5 and about 40 percent uncombined oxygen, based on the volume of said hydrocarbon.

4. The process as claimed in claim 3 in which said mono-olefinic hydrocarbon is normal butylene.

5. In the process of dehydrogenating an alkylated aromatic hydrocarbon having at least two carbon atoms in the alkyl chain which comprises passing said hydrocarbon together with steam at a dehydrogenation temperature over a dehydrogenation catalyst, the active ingredient of which is calcium nickel phosphate, the improvement which comprises carrying out said dehydrogenation in the presence of between about 5 and about 40 percent uncombined oxygen, based on the volume of said hydrocarbon.

6. The process as claimed in claim 5 in which said alkylated aromatic hydrocarbon is an ethylbenzene.

7. In the process of dehydrogenating a mono-olefinic hydrocarbon having at least four carbon atoms in the olefinic chain which comprises passing said mono-olefinic hydrocarbon together with steam and at a temperature between 550° C. and 650° C. over a dehydrogenation catalyst, the active ingredient of which is calcium nickel phosphate, the improvement which comprises effecting such dehydrogenation in the presence of between about 5 and about 40 percent uncombined oxygen, based on the volume of said mono-olefinic hydrocarbon.

8. The process as claimed in claim 7 in which said mono-olefinic hydrocarbon contains four carbon atoms in the olefinic chain.

9. The process as claimed in claim 7 in which said mono-olefinic hydrocarbon is normal butylene.

10. In the process of dehydrogenating normal butylene which comprises passing said normal butylene together with steam and at a temperature of 550–650° C. over a dehydrogenation catalyst the active ingredient of which is calcium nickel phosphate, the improvement which comprises effecting such dehydrogenation in the presence of between about 10 and about 30 parts of uncombined oxygen, based on the volume of said normal butylene.

11. In the process of dehydrogenating ethylbenzene which comprises passing ethylbenzene together with steam and at a temperature of 550–650° C. over a dehydrogenation catalyst, the active ingredient of which is calcium nickel phosphate, the improvement which comprises effecting such dehydrogenation in the presence of between about 10 and about 30 parts of uncombined oxygen, based on the volume of said ethylbenzene.

12. The process as claimed in claim 10 in which said oxygen is mixed in substantially pure form with said steam before entering the dehydrogenation reactor.

13. The process as claimed in claim 11 in which said oxygen is mixed in substantially pure form with said steam before entering the dehydrogenation reactor.

14. The process as claimed in claim 10 in which said oxygen is introduced by mixing air with said steam before said steam enters the dehydrogenation reactor.

15. The process as claimed in claim 11 in which said oxygen is introduced by mixing air with said steam before said steam enters the dehydrogenation reactor.

16. In the process of dehydrogenating a hydrocarbon selected from the class consisting of mono-olefins and alkylated aromatics which comprises passing said hydrocarbon together with steam and at a temperature of 550–650° C. over a dehydrogenation catalyst, the active ingredient of which is calcium nickel phosphate-chromium oxide, the improvement which comprises admixing between about 5 and about 40 parts of uncombined oxygen, based on the volume of said hydrocarbon with said steam before it is introduced to the dehydrogenation reactor.

17. The process as claimed in claim 16 in which said mono-olefin is normal butylene.

18. The process as claimed in claim 16 in which said alkylated aromatic is ethylbenzene.

19. In the process of dehydrogenating normal butylene which comprises contacting said normal butylene, admixed with steam and at a temperature of 550–650° C. with a calcium nickel phosphate-chromium oxide dehydrogenation catalyst, the step which comprises admixing between about 10 and about 30 parts of uncombined oxygen, based on the volume of said normal butylene, said steam before said steam is mixed with said normal butylene.

20. In the process of dehydrogenating ethylbenzene which comprises contacting said ethylbenzene, admixed with steam and at a temperature of 550–650° C. with a calcium nickel phosphate-chromium oxide dehydrogenation catalyst, the step which comprises admixing between about 10 and about 30 parts of uncombined oxygen, based on the volume of said ethylbenzene with said steam before the steam is admixed with said ethylbenzene.

References Cited in the file of this patent

UNITED STATES PATENTS

| | | |
|---|---|---|
| 1,214,204 | Mann et al. | Jan. 30, 1917 |
| 2,304,154 | Doran | Dec. 8, 1942 |
| 2,308,229 | Natta | Jan. 12, 1943 |
| 2,351,793 | Voorhees | June 20, 1944 |
| 2,442,320 | Britton et al. | May 25, 1948 |
| 2,509,900 | Wormith | May 30, 1950 |
| 2,824,843 | Dietzler et al. | Feb. 25, 1958 |